July 31, 1962
J. E. LANGAN
3,047,807
DELAY TIMER COMPRISING SUCCESSIVELY CHARGED CAPACITORS
WITH GASEOUS TUBE DISCHARGE MEANS
Filed Feb. 28, 1958
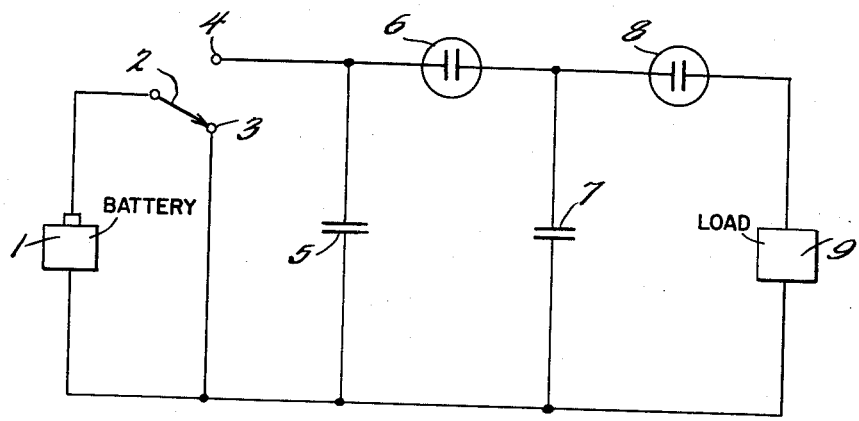
INVENTOR
Jeremiah E. Langan
BY
Watson, Cole, Grindle & Watson
ATTORNEYS United States Patent Office 3,047,807
Patented July 31, 1962

3,047,807
DELAY TIMER COMPRISING SUCCESSIVELY CHARGED CAPACITORS WITH GASEOUS TUBE DISCHARGE MEANS
Jeremiah E. Langan, 51 Carleton Terrace, Cresskill, N.J.
Filed Feb. 28, 1958, Ser. No. 718,346
5 Claims. (Cl. 328—72)

This invention relates to delay timers, and more particularly to means for providing electrical time delays for intervals of time varying from seconds to many hours duration, and which are arranged to produce an electrical pulse after a fixed delay by utilizing a nuclear constant current battery in a low-resistance electrical circuit containing capacitors and ionization diodes. The time of delay depends on the general principle that a specific time is required to charge a capacitor to a given potential or voltage. The voltage rise in the capacitor is limited to a small fraction of the equilibrium voltage of the nuclear battery by discharge of an ionization diode constructed so as to experience electrical breakdown at a predetermined voltage. In particular, the invention utilizes the sum of the times of several sequential chargings of capacitors to achieve time delays ranging from intervals of less than one second up to those of several hundred hours' duration. This circuit permits the small energy of the battery to be accumulated during the whole of the relatively long time interval.

The circuit provided by the invention, and the delay timers incorporating it provide numerous advantages. The circuit, including the nuclear battery, has long shelf and use life (25 years or more), and the high equilibrium voltages of the nuclear batteries, of the order of 10,000 v., assure nearly linear charging rates up to 500 v. for circuits containing capacitors and a minimum of resistance. The low resistance of the electrical circuit results in high efficiency in the accumulation of energy for use in the final timing pulse. Due to the simplicity of the circuit and the small number of components, a timer incorporating the circuit may be miniaturized. The circuit also permits construction of a timer which is free of influence by large mechanical accelerating forces. Wide temperature and pressure changes do not affect the timer, and miniature size and minimum weight is convenient and economical. Relatively large energy pulses compared to the battery current are accumulated for use in the timing pulse, and the electrical potential or voltage of the pulse of output signal can be fixed over a wide range of voltages. Furthermore, no liquid components with their attendant leakage problems are utilized, and there can be no failure due to repeated cycle fatigue.

An exemplary arrangement of a nuclear battery time delay circuit according to the invention is shown in the drawings in which battery 1 is a direct converter of nuclear energy from a β-emitter into electrical energy. The capacitors 5 and 7 are fixed selected capacitances, and the diodes 6 and 8 have fixed selected discharge potentials. The load, which can be any equipment to be actuated, is represented by box 9. The switch arm 2 can be made to contact points 3 or 4. The electrical resistance of the circuit connecting the components is as low as practical.

During storage and until the initiation of the time interval, the battery 1 is short circuited through switch 2 connected to contact 3. This prevents the accidental accumulation of any electrical charge which might prematurely and unintentionally actuate the circuit.

At the beginning of the desired time interval, switch 2 is connected to contact 4 which completes the circuit to connect nuclear battery 1 across capacitor 5. Diode 6 is an essentially open circuit until capacitor 5 receives sufficient electrical charge to increase its potential up to the discharge voltage of diode 6. This charging requires a finite time dependent on the magnitude of the constant current from the battery 1 and the capacitance of the capacitor 5. When the diode 6 is discharged, the quantity of electrical charge on 5 is shared with capacitor 7 proportionally to their respective capacitances. This sharing is essentially instantaneous because of the low resistance of the circuit. The voltage on each capacitance after sharing is equal and at a value less than the discharge voltage of diode 6.

The capacitor 5 is again charged until it has a potential difference above capacitor 7 sufficient to again discharge diode 6 and share this additional electrical charge with capacitor 7. This charging and sharing is repeated until finally capacitor 7 has a potential built up sufficient to discharge diode 8. When this happens, the timing pulse passes through box 9 representing the load. Since capacitor 7 discharges simultaneously with the final shared charge from capacitor 5 the energy of 5 augments the energy from capacitor 7 by simultaneously discharging through diodes 6 and 8 to the load 9. In the circuit described above, a time delay of 40 hours plus or minus 5% with an energy output of 15,000 ergs may be obtained when the battery 1 has a value of 30 microamperes; the capacitor 5 a value of .005 $\mu$f., 300 v.; the capacitor 7 a value of .03 $\mu$f., 600 v.; the diode 6 a discharge potential of 160 v.; and the diode 8 a discharge potential of 400 v. It will be understood that a variety of time intervals can be obtained by a choice of proper values for these elements of the circuit. The circuit is particularly adapted to provide time delays in the range from one second to several hundred hours.

What I claim is:

1. A timing circuit comprising a constant direct current source having a first and a second output terminal, a series circuit connected between said first and said second output terminal including a first gas diode, a second gas diode and a load, a first capacitor connected between said first and said second terminal and a second capacitor connected to said second terminal and to a point in said series circuit intermediate said first and said second gas diodes.

2. A timing circuit according to claim 1 in which the discharge potential of said second diode is greater than the discharge potential of said first diode.

3. A timing circuit according to claim 2 wherein the capacitance of said second capacitor is greater than the capacitance of said first capacitor.

4. A timing circuit according to claim 1, wherein said constant current source is a nuclear battery.

5. A delay timing circuit as claimed in claim 1 which comprises a starting switch movable to one position to close the connections between said battery and said first diode and said first capacitor and to a second position to open said connections and short circuit said battery.

References Cited in the file of this patent

UNITED STATES PATENTS 2,467,476   Hallmark _____ Apr. 19, 1949
2,555,143   Linder _____ May 29, 1951

UNITED STATES PATENT OFFICE
CERTIFICATE OF CORRECTION

Patent No. 3,047,807

July 31, 1962

Jeremiah E. Langan

It is hereby certified that error appears in the above numbered patent requiring correction and that the said Letters Patent should read as corrected below.

In the grant, lines 1 to 3, for "Jeremiah E. Langan, of Cresskill, New Jersey," read -- Jeremiah E. Langan, of Cresskill, New Jersey, assignor to Leesona Corporation, of Cranston, Rhode Island, a corporation of Massachusetts, --; line 12, for "Jeremiah E. Langan, his heirs" read -- Leesona Corporation, its successors --; in the heading to the printed specification, line 5, for "Jeremiah E. Langan, 51 Carleton Terrace, Cresskill, N. J." read -- Jeremiah E. Langan, Cresskill, N. J., assignor to Leesona Corporation, Cranston, R. I., a corporation of Massachusetts --.

Signed and sealed this 26th day of March 1963.

(SEAL)
Attest:

ERNEST W. SWIDER
Attesting Officer

DAVID L. LADD
Commissioner of Patents